United States Patent
Milan

(10) Patent No.: US 6,835,765 B1
(45) Date of Patent: Dec. 28, 2004

(54) USE OF FATTY ACID ALKANOLAMINE ESTERS AS ANTISTATICS

(75) Inventor: Sergio Milan, Barcelona (ES)

(73) Assignee: Cognis Deutschland GmbH & Co..KG, Duesseldorf (DE)

(*) Notice: Subject to any disclaimer, the term of this patent is extended or adjusted under 35 U.S.C. 154(b) by 0 days.

(21) Appl. No.: 09/890,295

(22) PCT Filed: Jan. 22, 2000

(86) PCT No.: PCT/EP00/00467

§ 371 (c)(1),
(2), (4) Date: Jul. 27, 2001

(87) PCT Pub. No.: WO00/44824

PCT Pub. Date: Aug. 3, 2000

(30) Foreign Application Priority Data

Jan. 30, 1999 (DE) .......................... 199 03 715

(51) Int. Cl.[7] .................................. C08K 5/00

(52) U.S. Cl. .................. 524/238; 524/239; 524/240

(58) Field of Search ................... 524/238, 239, 524/240

(56) References Cited

U.S. PATENT DOCUMENTS 2,678,285 A 5/1954 Browning
4,274,986 A * 6/1981 Ikenaga et al. .......... 528/245.5

FOREIGN PATENT DOCUMENTS

| | | |
|---|---|---|
| DE | 43 04 468 A1 | 8/1994 |
| FR | 2 078 048 A | 11/1971 |
| GB | 1 331 343 | 9/1973 |
| JP | 06 226266 | 8/1994 |
| WO | WO94/15011 | 7/1994 |

OTHER PUBLICATIONS

S. Riethmayer, "Antistatika", Gummi, Asbest, Kunststoffe, vol. 28, (1973), pp. 76–84, 86–88, 182–184, 298–308, 419–429, 506–512.

* cited by examiner

Primary Examiner—Edward J. Cain
(74) Attorney, Agent, or Firm—Aaron R. Ettelman; Steven J. Trzaska; Daniel S. Ortiz

(57) ABSTRACT

Antistatic properties are imparted to thermoplastics by contacting the thermoplastics with fatty acid alkanolamine esters and/or fatty acid partial glycerides. Thermoplastics having these antistatic properties provided by the compounds according to the invention are transparent with little tendency toward clouding.

7 Claims, No Drawings

USE OF FATTY ACID ALKANOLAMINE ESTERS AS ANTISTATICS

BACKGROUND OF THE INVENTION

This invention relates generally to thermoplastics and more particularly to the use of selected nitrogen-containing surfactants as antistatic additives.

PRIOR ART

Thermoplastics, preferably PVC, are used for the production of a number of articles of everyday life, of which films are among the most well-known. Like most plastics, thermoplastics are pronounced insulators by virtue of their chemical constitution. Unfortunately, a disadvantage is that fir thermoplastics readily develop electrostatic charges and, once applied, charges cannot be dissipated quickly enough on account of the low surface conductivity. In practice, the electrostatic charging of plastics can be troublesome and can also give rise to serious dangers. These include above all:

heavy soiling of plastic surfaces,
production stoppages through the blocking of film webs and
a sparking through intensive charging with subsequent ignition of dust/air mixtures.

In order to solve the problem of static charging, antistatic agents are generally added to the thermoplastics to dissipate the charges from the surface. Examples of internal antistatic agents, i.e. substances which are added to the polymer melt before or during processing, are anionic, nonionic or cationic surfactants. A relevant overview was published by S. Riethmayer in Gumml, Asbest, Kunstst., 26, pp. 76–88, 182–184, 298–308, 419, 429, 507–512 (1973).

Japanese patent application JP 94/226266 (Henkel) describes antistatic agents for PVC in the form of mixtures of complex esters, alkyl benzenesulfonates and alkyl sulfates. Polyol complex esters are known for the same purpose from German patent application DE-Al 4304468 (Henkel). Finally, antistatic agents for PVC in the form of mixtures of anionic surfactants (secondary alkane sulfonates) and non-ionic surfactants (amine polyglycol ethers) are commercially obtainable under the name of "Dehydat 80X" from Henkel KGaA.

However, the properties of known antistatic agents are still in need of improvement. They either fail to reduce the surface charge of the thermoplastics sufficiently quickly to the required level or, despite satisfactory antistatic properties, they lead to unwanted clouding in the films.

Accordingly, the problem addressed by the present invention was to finish thermoplastics in general and polyvinyl chloride and polyolefins in particular in such a way that, on the one hand, electrostatic charging would be significantly reduced and, on the other hand, transparent films permanently protected against clouding would be obtained.

DESCRIPTION OF THE INVENTION

The present invention relates to the use of fatty acid alkanolamine esters as antistatic agents for thermoplastics, more particularly for polyvinyl chloride and polyolefins.

It has surprisingly been found that fatty acid alkanolamine esters not only provide thermoplastics with excellent antistatic properties, they also lead to transparent films with hardly any tendency towards clouding, even in the event of prolonged storage.

Thermoplastics

In the context of the invention, the antistatic finish may be applied to thermoplastics in general. Typical examples are polyolefins, such as low-density and high-density polyethylene, polypropylene, polystyrene, vinyl polymers, polyamides, polyesters, polyacetals, polycarbonates and polyurethanes. However, the antistatic agents used in accordance with the invention are preferably incorporated in polyvinyl chlorides with K values in the range from 30 to 80.

Fatty Acid Alkanolamine Esters

The fatty acid alkanolamine esters are known substances. In a first and also preferred embodiment of the invention, the antistatic agents used are fatty acid triethanolamine esters which preferably correspond to formula (I):

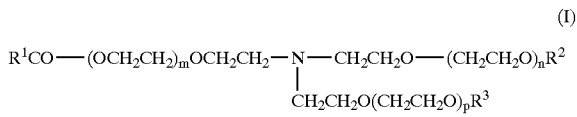

in which $R^1CO$ is an acyl group containing 6 to 22 carbon atoms, $R^2$ and $R^3$ independently of one another represent hydrogen or have the same meaning as $R^1CO$ and m, n and p together stand for 0 or numbers of 1 to 12. Typical examples of fatty acid triethanolamine esters which may be used in accordance with the present invention are products based on caproic acid, caprylic acid, capric acid, lauric acid, myristic acid, palmitic acid, isostearic acid, stearic acid, oleic acid, elaidic acid, arachic acid, behenic acid and erucic acid and the technical mixtures thereof obtained, for example, in the pressure hydrolysis of natural fats and oils. Technical $C_{12/18}$ coconut fatty acids and, in particular, partly hydrogenated $C_{16/18}$ tallow or palm oil fatty acids and $C_{16/18}$ fatty acid cuts rich in elaidic acid are preferably used. To produce the esters, the fatty acids and the triethanolamine may be used in a molar ratio of 1.1:1 to 3:1. With the performance properties of the esters in mind, a ratio of 1.2:1 to 2.2:1 and preferably 1.5:1 to 1.9:1 has proved to be particularly advantageous. The preferred fatty acid triethanolamine esters are technical mixtures of mono-, di- and triesters with an average degree of esterification of 1.5 to 1.9 and are derived from technical $C_{16,18}$ tallow or palm oil fatty acid (iodine value 0 to 40). In performance terms, fatty acid triethanolamine ester salts corresponding to formula (I), in which $R^1CO$ is an acyl group containing 16 to 18 carbon atoms, $R^2$ has the same meaning as $R^1CO$, $R^3$ is hydrogen and m, n and p stand for 0 have proved to be particularly advantageous.

Besides the fatty acid triethanolamine esters, other suitable antistatic agents are esters of fatty acids with diethanolalkyamines corresponding to formula (II):

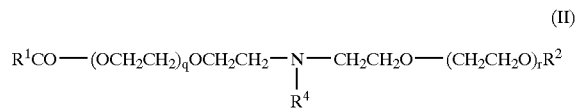

in which $R^1CO$ is an acyl group containing 6 to 22 carbon atoms, $R^2$ is hydrogen or has the same meaning as $R^1CO$, $R^4$ is an alkyl group containing 1 to 4 carbon atoms and q and r together stand for 0 or numbers of 1 to 12.

Finally, a third group of suitable trialkanolamine esters are the esters of fatty acids with 1,2-dihydroxypropyl dialkylamines corresponding to formula (III):

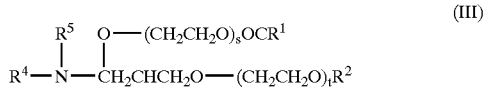

(III)

in which $R^1CO$ is an acyl group containing 6 to 22 carbon atoms, $R^2$ is hydrogen or has the same meaning as $R^1CO$, $R^4$ and $R^5$ independently of one another are alkyl groups containing 1 to 4 carbon atoms and s and t together stand for 0 or numbers of 1 to 12. So far as the choice of the preferred fatty acids and the optimal degree of esterification are concerned, the examples mentioned for (I) also apply to the alkanolamine esters corresponding to formulae (II) and (III).

Partial Glycerides

In another preferred embodiment of the invention, the fatty acid alkanolamine esters are used together with lubricants of the partial glyceride type which produce a synergistic improvement in color stability. Partial glycerides, i.e. monoglycerides, diglycerides and technical mixtures thereof may still contain small quantities of triglycerides from their production. The partial glycerides preferably correspond to formula (IV):

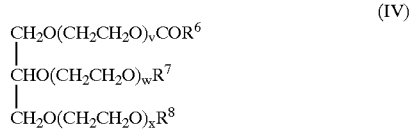

(IV)

in which $R^5CO$ is a linear or branched, saturated and/or unsaturated acyl group containing 6 to 22 and preferably 12 to 18 carbon atoms, RT and $R^8$ independently of one another have the same meaning as $R^6CO$ or represent OH and the sum (v+w+x) is 0 or a number of 1 to 100 and preferably 5 to 25, with the proviso that at least one of the two substituents $R^6$ and $R^7$ represents OH. Typical examples are mono- and/or diglycerides based on caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures 1,1, thereof. Technical lauric acid glycerides, palmitic acid glycerides, stearic acid glycerides, isostearic acid glycerides, oleic acid glycerides, behenic acid glycerides and/or erucic acid glycerides which have a monoglyceride content of 50 to 95% by weight and preferably 60 to 90% by weight are preferably used. The ratio by weight between the trialkanolamine esters and the partial glycerides may be in the range from 90:10 to 10:90 and is preferably in the range from 75:25 to 25:75 and more particularly in the range from 60:40 to 40:60.

Sorbitan Esters

In another preferred embodiment of the invention, the fatty acid alkanolamine esters are used together with lubricants of the sorbitan ester type which also produce a synergistic improvement in color stability. Sorbitan esters preferably correspond to formula (V):

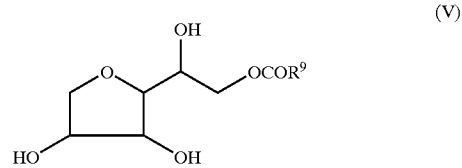

(V)

in which $R^9CO$ represents linear or branched, saturated or unsaturated acyl groups containing 6 to 22 and preferably 12 to 18 carbon atoms. Although formula (1) only represents sorbitan monoesters, sorbitan di-, sesqui- and tri-esters and mixtures thereof are also suitable. Typical examples are mono-, sesqui-, di- and/or triesters of sorbitan with caproic acid, caprylic acid, 2-ethyl hexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof. The ratio by weight between the trialkanolamine esters and the sorbitan esters may be in the range from 90:10 to 10:90 and is preferably in the range from 75:25 to 25:75 and more particularly in the range from 60:40 to 40:60.

Internal and external application

The thermoplastics are antistatically finished, for example, by mixing the powdered or granulated polymers with the additives and intensively homogenizing the resulting mixture. This may be done by individually adding the additives, i.e. for example flow improvers, stabilizers, lubricants, antistatic agents, plasticizers, etc. However, a so-called masterbatch, i.e. a homogeneous mixture of all additives, may also be prepared and then mixed with the plastic. It is advisable to carry out the mixing step in the presence of heat, preferably above the softening point of the thermoplastic, and then immediately to process the additive-containing mixture, i.e. for example by extrusion, injection molding, calendering, rolling, blow molding, stretch forming and the like. Besides being used as internal antistatic agents, the fatty acid alkanolamine esters may also be used as external antistatic agents, i.e. the esters are applied to the surface from a solution in water or an alcohol.

Auxiliaries and Additives

The fatty acid alkanolamine esters may be used together with other auxiliaries and additives for the production and processing of thermoplastics such as, for example, flow improvers and impact modifiers, lubricants, stabilizers, plasticizers, co-antistatics, fillers, pigments and the like.

Examples of suitable impact modifiers are ethylene/vinyl acetate copolymers as graft base, ethylenelvinyl acetatelvinyl chloride graft polymers, polyacrylate/vinyl chloride graft polymers, acrylate/methyl methacrylate graft polymers, chlorinated polyethylene, methyl methacrylate/butadiene/styrene graft polymer and acrylonitrile/butadiene/styrene terpolymer (the last two for internal application).

Typical lubricants include, for example, hydrocarbons (paraffin oils, natural paraffins, synthetic paraffins, low-density and high-density polyethylene waxes, polypropylene waxes), alcohols (cetyl alcohol, stearyl alcohol, tallow fatty alcohol), ketones (stearone), carboxylic acids (lauric acid, myrisbc acid, palmitic acid, stearic acid, hydroxystearic acid, tallow fatty acid, arachic acid, behenic acid, montanic acid, oxidized polyethylene waxes), metal salts of carboxylic acids (calcium stearate, zinc stearate, lead stearate, calcium montanate, calcium salts of oxidized polyethylene waxes or synthetic wax acids), carboxylic acid amides (oleic acid amide, erucic acid amide, stearic acid amide, ethylene distearoyl diamide), carboxylic acid esters (ethyl stearate, n-butyl stearate, isobutyl stearate, isooctyl stearate, isotridecyl stearate, cetyl palmitate, cetyl stearate, ethylene glycol monostearate, glycerol monooleate, glycerol monoricinoleate, glycerol monostearate, glycerol mono-12-hydroxystearate, glycerol tristearate, glycerol tri-12-hydroxystearate, glycerol tribehenate, glycerol trimontanate, pentaerythritol tetrastearate, pentaerythritol tetrabehenate, mixed esters of adipic acid, pentaerythritol and stearic acid, montanic acid esters, partly saponified montanic acid esters).

In one preferred embodiment of the invention, the esterquats are used together with lubricants of the fatty acid, fatty alcohol and/or partial glyceride type, the ratio by weight of the components being in the range from 90:10 to 60:40. The mixtures have the advantage of a very positive effect on the 0 color stability of the plastics.

The stabilizers are divided into UV absorbers (hydroxybenzophenones, hydroxyphenyl benzotriazoles, cinnamic acid esters, oxalanilides), quenchers (essentially nickel complexes), hydroperoxide decomposers (thiocarbamates, thiophosphates, thiobisphenolates) and radical scavengers (sterically hindered amines). The following substances—which are used in particular for stabilizing polyvinyl chloride—are mentioned as representative of the large number of stabilizers: 2-hydroxy-n-octoxy benzophenone, 2-(2'-hydroxy-5'-methylphenyl) benzotriazole, 2-(2'-hydroxy-3',5'-di-tertbutylphenyl) benzotriazole, 2,2'-dihydroxybenzophenone, 2-hydroxy4-methoxybenzo-phenone, N,N'-(2-ethyl-2'-ethoxyphenyl)-oxalic acid amide, 2-carbmethoxy-4'-methoxycinnamic acid methyl ester, 2-cyano-3methyl4'-methoxycinnamic acid methyl ester, sebacic acid bis-2,2,6,6-tetramethyl4-piperidyl ester, organtotin carboxylates. O-keto compounds such as, for example, Pdiketones and l-ketocarboxylic acids are also suitable.

Examples of suitable plasticizers are phthalic acid esters (dimethyl phthalate, diethyl phthalate, dibutyl phthalate, dihexyl phthalate, di2-othyl hexyl phthalate, di-noctyl phthalate, di-1-octylphthalate, di-1-nonyl phthalate, di-1-decyl phthalate, di-1-tridecyl phthalate, dicyclohexyl phthalate, dimethyl cyclohexyl phthalate, dimethyl glycol phthalate, dibutyl glycol phthalate, benzyl butyl phthalate, diphenyl phthalate), phosphoric acid esters (tributyl phosphate, tri-2-ethylbutyl phosphate, tri-2-ethyl hexyl phosphate, trichloroethyl phosphate, 2-ethyl hexyl diphenyl phosphate, cresyl diphenyl phosphate, triphenyl phosphate, tricresyl phosphate, trixylenyl phosphate), esters of adipic, azelaic and sebacic acid (di-2-ethyl hexyl adipate, di-icl adipate, di-1-nonyl adipate, di-1-decyl adipate, benzyl butyl adipate, benzyl octyl adipate, di-2-ethyl hexyl azelate, di-2-ethyl hexyl sebacate, di-1-decyl sebacate), fatty acid esters, epoxidized fatty acid esters, citric acid esters, esters of acetic, propionic and butyric acid, esters of ethyl butyric and ethyl hexanoic acid, glycolic acid esters, polyesters, chloroparaffins, hydrocarbons, benzoic acid esters, trimellitic acid esters, sulfonic acid esters and sulfamides, alcohols, ethers and ketones and abiefc acid esters.

Suitable fillers are carbonates (calcium carbonate, dolomite), silicates (talcum, asbestos, kaolin, mica), silicon dioxide, aluminium hydroxide, carbon black, organic substances (nutshells, wood meal, corn cobs), glass fibers, glass beads, hollow glass beads, carbon fibers, aramide fibers, whiskers and the like. Examples of suitable pigments are titanium dioxide, iron oxides, pigment blacks, chrome yellow pigments, molybdate red pigments, chrome oxide green pigments, mixed phase pigments and cadmium pigments.

The auxiliaries may be added in total quantities—based on 100 parts by weight of thermoplastic—of 1 to 10 and preferably 4 to 8 parts by weight.

EXAMPLES

Examples 1 to 14, Comparison Examples C1 to C10. Polyvinyl chlorides and polyolefins were processed to films after the addition of various antistatic agents and auxiliaries [(tr)=transparent, (op)=opaque]. The surface of the films was then charged under defined conditions and the discharge time was measured. Antistatic activity is determined by multiplying the discharge time from 100 or 500 to 0 volt in h by ohms. The lower the value, the better the antistatic effect. The thermal stability of the polymers was defined by two parameters, i.e. the time interval (a) before the first sign of discoloration on exposure to heat and the time (b) elapsing before the film melts. The results are set out in Tables 1 and 2. Examples 1 to 14 correspond to the invention, Examples C1 to C10 are intended for comparison. Where fatty acid alkanolamine esters were used in accordance with the invention, optionally in admixture with other additives, transparent films with a good antistatic finish were obtained.

TABLE 1

Static charging of PVC (quantities in parts by weight)

| Component | C1 | C2 | C3 | 1 | 2 | 3 | 4 | 5 | 6 | 7 | 8 | 9 | 10 | 11 |
|---|---|---|---|---|---|---|---|---|---|---|---|---|---|---|
| Polyvinyl chloride, K = 70 | 100 | 100 | 100 | 100 | 100 | 100 | 100 | 100 | 100 | 100 | 100 | 100 | 100 | 100 |
| Dioctyl phthalate | 50 | 50 | 50 | 50 | 50 | 50 | 50 | 50 | 50 | 50 | 50 | 50 | 50 | 50 |
| Epoxidized soybean oil | 2 | 2 | 2 | 2 | 2 | 2 | 2 | 2 | 2 | 2 | 2 | 2 | 2 | 2 |
| Calcium/zinc stabilizer | 2 | 2 | 2 | 2 | 2 | 2 | 2 | 2 | 2 | 2 | 2 | 2 | 2 | 2 |
| Glycerol monostearate | — | 1 | — | — | 0.75 | — | — | | | | | | | |
| Sorbitan monopalmitate | — | — | 1 | — | — | 0.75 | 0.25 | | | | | | | |
| Triethanolamine distearate | — | — | — | 1 | 0.25 | 0.25 | 0.25 | 0.95 | 0.90 | 0.95 | 0.95 | 0.95 | 0.95 | 0.95 |
| Pentaerythritol | | | | | | | | 0.05 | 0.10 | — | — | — | — | — |
| Bisphenol A | | | | | | | | — | — | 0.05 | — | — | — | — |
| Hydrotalcite | | | | | | | | — | — | — | 0.05 | — | — | — |
| Butyl hydroxytoluene | | | | | | | | — | — | — | — | 0.05 | — | — |
| Sorbitol | | | | | | | | — | — | — | — | — | 0.05 | — |
| Di-trimethyl propane | | | | | | | | — | — | — | — | — | — | 0.05 |
| Appearance of the PVC film | op | tr | tr | tr | tr | tr | tr | tr | tr | tr | tr | tr | tr | tr |
| First yellowing [mins] | 20 | 20 | 20 | 20 | 20 | 20 | 20 | 50 | 60 | 30 | 30 | 45 | 30 | 20 |
| Static thermal stability [mins] | 50 | 50 | 50 | >50 | >50 | >50 | >50 | 60 | 60 | 80 | 70 | 70 | 60 | 50 |
| | Residual surface charge ($10^{10}$ Ω) | | | | | | | Residual surface charge ($10^8$ Ω) | | | | | | |
| −100 V, 1 d | 143 | 7.2 | 7.5 | 5.9 | 1.3 | 1.3 | 1.3 | 10 | 18 | 200 | 260 | 480 | 950 | 190 |
| −500 V, 1 d | 83 | 6.1 | 6.0 | 4.3 | 1.5 | 1.5 | 1.5 | 13 | 24 | 120 | 2000 | 4000 | 5200 | 1200 |
| −100 V, 7 d | 22 | 0.9 | 0.8 | 0.2 | 0.2 | 0.2 | 0.2 | 60 | 24 | 180 | 85 | 32 | 23 | 30 |
| −500 V, 7 d | 19 | 0.6 | 0.5 | 0.2 | 0.2 | 0.2 | 0.2 | 44 | 24 | 180 | 64 | 38 | 22 | 26 |

TABLE 2

Static charging of polyolefins (quantities in parts by weight)

| Component | 12 | C5 | C6 | C7 | 13 | C8 | C9 | C10 | 14 | C11 | C12 | C13 |
|---|---|---|---|---|---|---|---|---|---|---|---|---|
| Low-density polyethylene | 100 | 100 | 100 | 100 | — | — | — | — | — | — | — | — |
| High-density polyethylene | — | — | — | — | 100 | 100 | 100 | 100 | — | — | — | — |
| Polypropylene | — | — | — | — | — | — | — | — | 100 | 100 | 100 | 100 |
| Triethanolamine distearate | 0.03 | — | — | — | 0.03 | — | — | — | 0.03 | — | — | — |
| Esterquat A* | — | 0.03 | — | — | — | 0.03 | — | — | — | 0.03 | — | — |
| Esterquat B** | — | — | 0.03 | — | — | — | 0.03 | — | — | — | 0.03 | — |
| Esterquat C*** | — | — | — | 0.15 | — | — | — | 0.15 | — | — | — | 0.15 |
| Glycerol monostearate | 0.12 | 0.12 | 0.12 | — | 0.12 | 0.12 | 0.12 | — | 0.12 | 0.12 | 0.12 | — |
| Residual surface charge [1*10 × Ω] | | | | | | | | | | | | |
| −100 V, 3 d | 11 | 12 | 12 | 18 | 16 | 18 | 17 | 17 | 16 | 18 | 16 | 18 |
| −100 V, 8 d | 9 | 10 | 10 | 17 | 16 | 17 | 15 | 14 | 14 | 14 | 14 | 18 |
| −100 V, 30 d | 9 | 10 | 11 | 13 | 12 | 14 | 13 | 13 | 12 | 13 | 14 | 15 |

*Dehyquart AU 46: based on partly hydrogenated tallow fatty acid
**Dehyquart AU 18: based on stearic acid
***Dehyquart F30: mixture of (a) 30 parts esterquat based on partly hydrogenated palm oil fatty acid and (b) 70 parts stearyl alcohol

What is claimed is:

1. A method of imparting antistatic properties to a thermoplastic comprising contacting a thermoplastic with from about 0.5 to about 5 parts by weight based on the weight of the thermoplastic, of an antistatic agent of the formula (I):

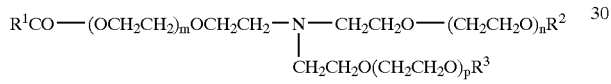

wherein $R^1CO$ is an acyl group having from about 6 to about 22 carbon atoms; each of $R^2$ and $R^3$ is independently hydrogen or $R^1CO$; m, n and p together stand for 0 or numbers of 1 to 12.

2. A method of imparting antistatic properties to a thermoplastic comprising contacting a thermoplastic with from about 0.5 to about 5 parts by weight of an antistatic agent of the formula (II):

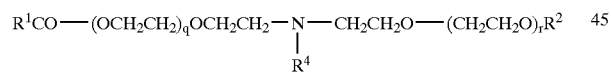

wherein $R^1CO$ is an acyl group having from about 6 to about 22 carbon atoms, $R^2$ is hydrogen or $R^1CO$: $R^4$ is an alkyl group having from 1 to about 4 carbon atoms and q and r together stand for 0 or numbers of 1 to 12.

3. A method of imparting antistatic properties to a thermoplastic comprising contacting a thermoplastic with from about 0.5 to about 5 parts by weight of an antistatic agent of the formula (III):

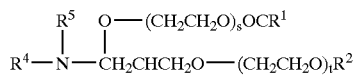

wherein $R^1CO$ is an acyl group having from about 6 to about 22 carbon atoms; $R^2$ is hydrogen or $R^1CO$, each of $R^4$ and $R^5$ is independently an alkyl group having 1 to about 4 carbon atoms and s and t together stand for 0 or numbers of 1 to 12.

4. The method of claim 2 further comprising contacting the thermoplastic with a lubricant selected from the group consisting of a compound corresponding to formula (IV):

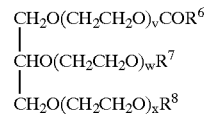

wherein $R^6CO$ is a linear or branched, saturated and/or unsaturated acyl group having from 6 to 22 carbon atoms; each of $R^7$ and $R^8$ is $R^6CO$ or OH with the proviso that at least one of $R^6$ and $R^7$ is OH; each of m, n, and p is a number for 0 to 100 such that the sum of v+w+x has a value of from 0 to 100; a compound corresponding to formula (V):

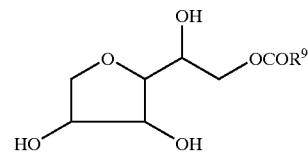

wherein $R^9CO$ is a linear or branched, saturated or unsaturated acyl group having from 6 to 22 carbon atoms, and mixtures thereof.

5. The method of claim 3 further comprising contacting the thermoplastic with a lubricant selected from the group consisting of a compound corresponding to formula (IV):

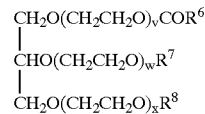

wherein $R^6CO$ is a linear or branched, saturated and/or unsaturated acyl group having from 6 to 22 carbon atoms; each of $R^7$ and $R^8$ is $R^6CO$ or OH with the proviso that at least one of $R^6$ and $R^7$ is OH; each of m, n, and p is a number for 0 to 100 such that the sum of v+w+x has a value of from 0 to 100; a compound corresponding to formula (V):

9

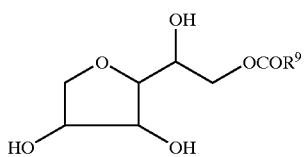

wherein R⁹CO is a linear or branched, saturated or unsaturated acyl group having from 6 to 22 carbon atoms, and mixtures thereof.

6. A polymeric composition comprising:
  (a) a thermoplastic;
  (b) from about 0.5 to 5 parts by weight, based on the weight of the thermoplastic, of an antistatic additive selected from the group consisting of a compound corresponding to formula (I):

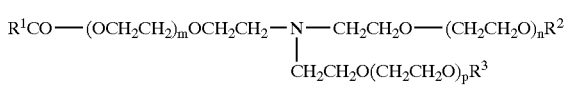

(I)

wherein R¹CO is an acyl group having from about 6 to about 22 carbon atoms; each of R² and R³ is independently hydrogen or R¹CO; m, n and p together stand for 0 or numbers of 1 to 12, a compound corresponding to formula (II):

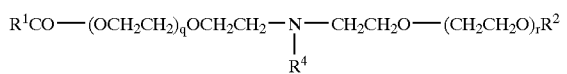

(II)

wherein R¹CO is an acyl group having from about 6 to about 22 carbon atoms. R² is hydrogen or R¹CO; R⁴ is an alkyl group having from 1 to about 4 carbon atoms and q and r together stand for 0 or numbers of 1 to 12, a compound corresponding to formula (III);

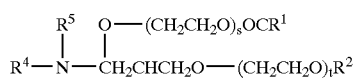

(III)

wherein R¹CO is an acyl group having from about 6 to about 22 carbon atoms; R² is hydrogen or R¹CO, each of R⁴ and R⁶ is independently an alkyl group having 1 to about 4 carbon atoms and s and t together stand for 0 or numbers of 1 to 12, and mixtures thereof; and
  (c) optionally, a lubricant selected from the group consisting of a compound corresponding to formula (IV):

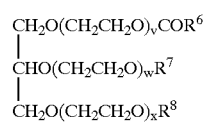

(IV)

wherein R6CO is a linear or branched, saturated and/or unsaturated acyl group having from 6 to 22 carbon atoms;

10 each of R⁷ and R⁸ is R⁶CO or OH with the proviso that at least one of R⁶ and R⁷ is OH; each of m, n, and p is a number for 0 to 100 such that the sum of v+w+x has a value of from 0 to 100; a compound corresponding to formula (V):

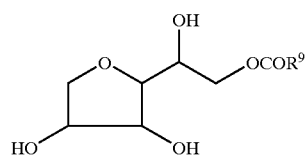

(V)

wherein R⁹CO is a linear or branched, saturated or unsaturated acyl group having from 6 to 22 carbon atoms, and mixtures thereof.

7. A method of imparting antistatic properties to a thermoplastic comprising contacting a thermoplastic with from about 0.5 to about 5 parts by weight, based on the weight of the thermoplastic, of an antistatic agent of the formula (I);

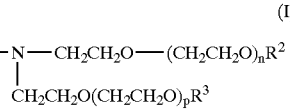

(I)

wherein R¹CO is an acyl group having from about 6 to about 22 carbon atoms; each of R² and R³ is independently hydrogen or R¹CO; m, n and p together stand for 0 or numbers of 1 to 12; and a lubricant selected from the group consisting of a compound corresponding to formula (IV):

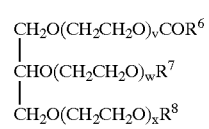

(IV)

wherein R⁸CO is a linear or branched, saturated and/or unsaturated acyl group having from 6 to 22 carbon atoms; each of R⁷ and R⁸ is R⁶CO or OH with the proviso that at least one of R⁶ and R⁷ is OH; each of m, n, and p is a number for 0 to 100 such that the sum of v+w+x+has a value of from 0 to 100: a compound corresponding to formula (V):

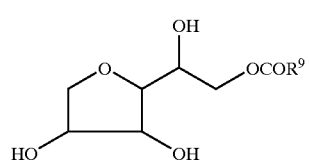

(V)

wherein R⁹CO is a linear or branched, saturated or unsaturated acyl group having from 6 to 22 carbon atoms, and mixtures thereof.

* * * * *